US010649900B2

(12) United States Patent
Nakra et al.

(10) Patent No.: US 10,649,900 B2
(45) Date of Patent: May 12, 2020

(54) METHOD TO AVOID CACHE ACCESS CONFLICT BETWEEN LOAD AND FILL

(71) Applicant: Samsung Electronics Co., Ltd., Suwon-si, Gyeonggi-do (KR)

(72) Inventors: Tarun Nakra, Austin, TX (US); Hao Wang, Cedar Park, TX (US); Paul Kitchin, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 69 days.

(21) Appl. No.: 15/900,789

(22) Filed: Feb. 20, 2018

(65) Prior Publication Data

US 2019/0138450 A1 May 9, 2019

Related U.S. Application Data

(60) Provisional application No. 62/582,279, filed on Nov. 6, 2017.

(51) Int. Cl.
| | |
|---|---|
| *G06F 12/00* | (2006.01) |
| *G06F 12/0855* | (2016.01) |
| *G06F 12/0884* | (2016.01) |
| *G06F 12/0864* | (2016.01) |
| *G06F 12/0897* | (2016.01) |
| *G06F 12/0846* | (2016.01) |

(52) U.S. Cl.
CPC ...... *G06F 12/0857* (2013.01); *G06F 12/0846* (2013.01); *G06F 12/0864* (2013.01); *G06F 12/0884* (2013.01); *G06F 12/0897* (2013.01); *G06F 2212/1021* (2013.01); *G06F 2212/1024* (2013.01); *G06F 2212/507* (2013.01); *G06F 2212/6082* (2013.01)

(58) Field of Classification Search
CPC ............. G06F 12/0857; G06F 12/0884; G06F 12/0864; G06F 12/0897; G06F 12/0846; G06F 2212/1021; G06F 2212/507; G06F 2212/6082; G06F 2212/1024
See application file for complete search history.

(56) References Cited

U.S. PATENT DOCUMENTS

| | | | | |
|---|---|---|---|---|
| 5,455,924 A | * | 10/1995 | Shenoy ................. | G06F 9/3836 710/1 |
| 5,930,819 A | * | 7/1999 | Hetherington ...... | G06F 12/0851 711/131 |
| 6,374,344 B1 | * | 4/2002 | Webb, Jr. ............ | G06F 12/0859 711/118 |
| 7,730,283 B2 | | 6/2010 | Luick | |
| 8,001,330 B2 | | 8/2011 | Clark et al. | |

(Continued)

*Primary Examiner* — Kalpit Parikh
(74) *Attorney, Agent, or Firm* — Renaissance IP Law Group LLP (57) ABSTRACT

According to one general aspect, an apparatus may include a first cache configured to store data. The apparatus may include a second cache configured to, in response to a fill request, supply the first cache with data, and an incoming fill signal. The apparatus may also include an execution circuit configured to, via a load request, retrieve data from the first cache. The first cache may be configured to: derive, from the incoming fill signal, address and timing information associated with the fill request, and based, at least partially, upon the address and timing information, schedule the load request to attempt to avoid a load-fill conflict.

20 Claims, 5 Drawing Sheets

(56) References Cited

U.S. PATENT DOCUMENTS

| | | |
|---|---|---|
| 8,214,617 B2 | 7/2012 | Min et al. |
| 9,448,936 B2 | 9/2016 | Goel et al. |
| 2007/0288725 A1 | 12/2007 | Luick |

* cited by examiner

METHOD TO AVOID CACHE ACCESS CONFLICT BETWEEN LOAD AND FILL

CROSS-REFERENCE TO RELATED APPLICATION

This application claims priority under 35 U.S.C. § 119 to Provisional Patent Application Ser. No. 62/582,279, entitled "METHOD TO AVOID CACHE ACCESS CONFLICT BETWEEN LOAD AND FILL" filed on Nov. 6, 2017. The subject matter of this earlier filed application is hereby incorporated by reference.

TECHNICAL FIELD

This description relates to a method, apparatus, and system to avoid cache access conflict between load and fill.

BACKGROUND

In computing, a cache is generally a hardware component that stores data so future requests for that data can be served faster. The data stored in a cache might be the result of an earlier computation, and/or the duplicate of data stored elsewhere. A cache hit occurs when requested data can be found in a cache, while a cache miss occurs when that requested data cannot be found in the cache. Cache hits are served by reading data from the cache, which is faster than reading the data from a slower data storage or memory. The more requests that can be served from the cache, the faster the system generally performs.

To be cost-effective and to enable efficient use of data, caches are relatively small. Nevertheless, caches have proven themselves in many areas of computing because typical computer applications tend to access data in recognizable patterns. These patterns typically exhibit a locality of reference (i.e. data requested in the future tends to be similar in some way to previously requested data). Some access patterns exhibit temporal locality, i.e. data may be requested again if it has been recently requested already. Other patterns exhibit spatial locality, which refers to requests for data that is physically stored close to data that has been already requested. Other forms of locality exist.

A cache replacement policy decides where in the cache a copy of a particular entry of data will go. If the replacement policy is free to choose any entry in the cache to hold the copy, the cache is called fully associative. At the other extreme, if each entry in main memory can go in just one place in the cache, the cache is direct mapped. Many caches implement a compromise in which each entry in main memory can go to any one of N places in the cache, and are described as N-way set associative. For example, the level-1 data cache in many processors is two-way or four-way set associative, which means that any particular location in main memory can be cached in either of two or four locations in the level-1 data cache.

Further, as with most memories, the cache only has so many ports by which data may be read from or written to. If more read/write accesses as scheduled to occur to a memory than there are read/write ports, then a conflict occurs and one or more of the data accesses must wait or be denied.

SUMMARY

According to one general aspect, an apparatus may include a first cache configured to store data. The apparatus may include a second cache configured to, in response to a fill request, supply the first cache with data, and an incoming fill signal. The apparatus may also include an execution circuit configured to, via a load request, retrieve data from the first cache. The first cache may be configured to: derive, from the incoming fill signal, address and timing information associated with the fill request, and based, at least partially, upon the address and timing information, schedule the load request to attempt to avoid a load-fill conflict.

According to another general aspect, a system may include a processor circuit and a memory system. The processor circuit may be configured to: execute instructions associated with data, and retrieve, via a load request, data stored in a first cache. The memory system may include the first cache configured to store data for the processor circuit, and a second cache configured to, in response to a fill request, supply the first cache with data, and an incoming fill signal. The first cache is configured to: derive, from the incoming fill signal, address and timing information associated with the fill request, and based, at least partially, upon the address and timing information, schedule the load request to attempt to avoid a load-fill conflict.

According to another general aspect, an apparatus may include a plurality of memory cells comprising a plurality of banks and ways, and configured to store data. The apparatus may include a load scheduler circuit configured to schedule when each of a plurality of load requests will be processed by the apparatus, wherein processing a load request comprises retrieving data from the plurality of memory cells. The load scheduler may be further configured to: derive, from an incoming fill signal, address and timing information associated with a fill request, and based, at least partially, upon the address and timing information, schedule the plurality of load requests to attempt to avoid a load-fill conflict.

The details of one or more implementations are set forth in the accompanying drawings and the description below. Other features will be apparent from the description and drawings, and from the claims.

A system and/or method for avoiding cache access conflict between load and fill, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
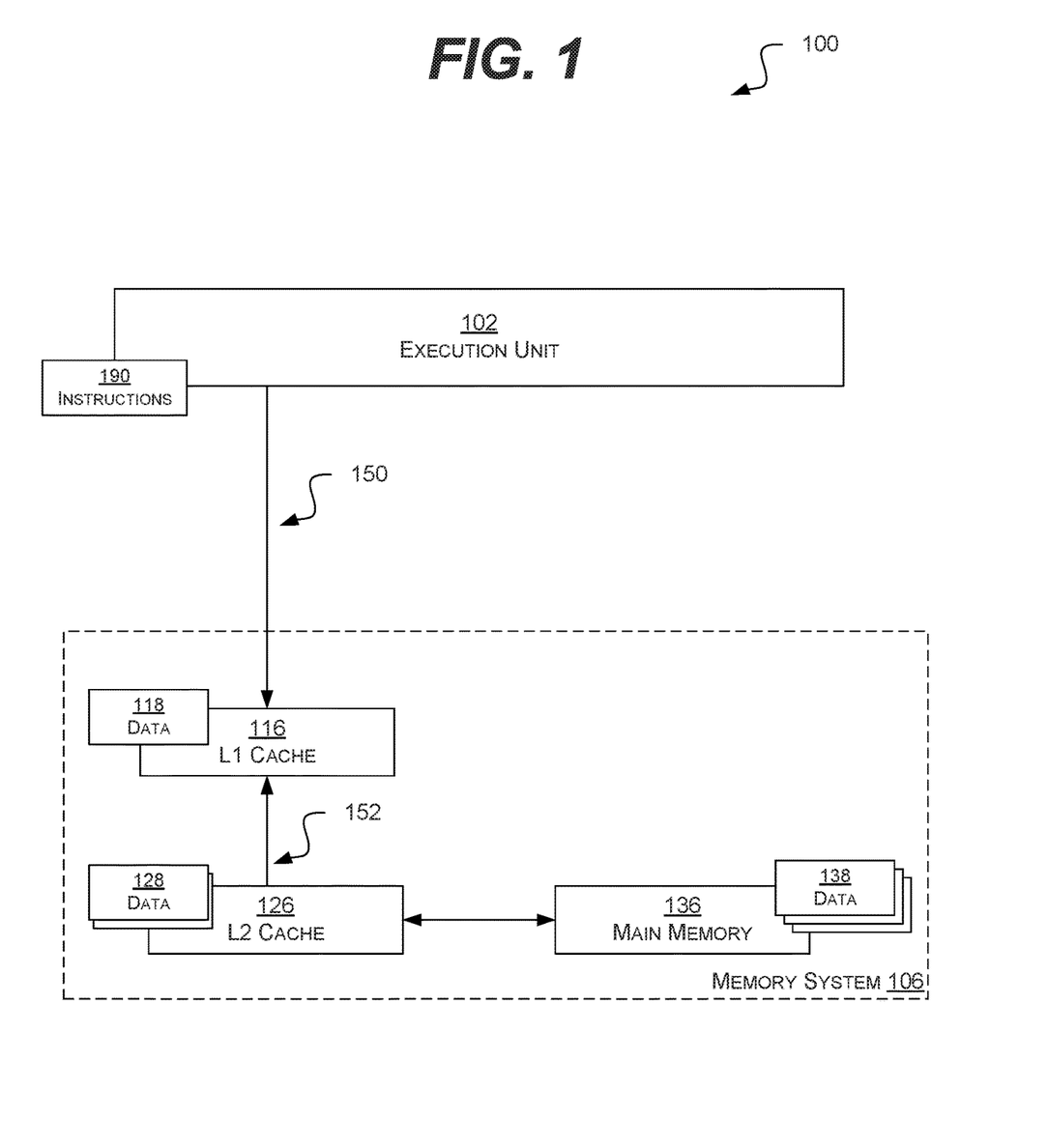
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include a microprocessor or a system-on-a-chip (SoC) or other computing apparatus.

In the illustrated embodiment, the system 100 may include an execution unit or circuit 102. The execution unit 102 may include a circuit or group of logic devices configured to perform one or more logic operations. Examples of execution units 102 may include, but are not limited to floating point units, load/store units, instruction decode units, arithmetic logic units. In the illustrated embodiment, the execution unit 102 may be configured to execute one or more instructions 190.

The execution unit 102 may also request data. This data may be stored in a memory system 106. In various embodiments, all or part of the memory system 06 may be included on the same die or package as the execution unit 102. For example, in one embodiment, the L1 cache 116 and L2 cache 126 may be integrated with the execution unit 102, but the main memory 136 may not be.

In various embodiments, the memory system 106 may include a plurality of tiers or levels of cache. In the illustrated embodiment, the memory system 106 may include a level 1 (L1) cache 116 that stores a relatively small sub-set of data 118. The memory system 106 may include a level 2 (L2) cache 126 that stores a relatively moderate sub-set of data 128. In various embodiments, the L2 cache 126 may include a copy of all of the data 118 stored by the L1 cache 116. The memory system 106 may include a main memory 136 that stores a relatively large set of data 138. In various embodiments, the main memory 136 may include a copy of all of the data 128 stored by the L2 cache 126.

In the illustrated embodiment, the execution unit 102 may request that data be read from (loaded from) the L1 cache 116 via a load request 150. If the desired data is not in the L1 cache 116 it may be retrieved from the L2 cache 126 or other memory (e.g., main memory 136). This data from the L2 cache 126 may be entered into the L1 cache 116 via a fill request 152.

If the L1 cache 116 does not have enough read/write ports, subsequent load requests 150 may conflict with the results of previous fill requests 152. In such an embodiment, how the conflicts are handled depend upon the implementation of the L1cache 116. In some embodiments, incoming fill requests 152 may not be ignored and as a result the load request 150 must be delayed or denied. In such an embodiment, if the load request 150 may not be buffered, it must be started over again from the very beginning. It is understood that the above is merely one illustrative example to which the disclosed subject matter is not limited.

In the illustrated embodiment, the L1 cache 116 may be configured to predict when a fill request 152 will arrive at the L1 cache 116 and if it will or may conflict with a pending load request 150. If so, the L1 cache 116 may attempt to re-schedule the conflicting load request 150 to avoid the conflict.

Figure 2:
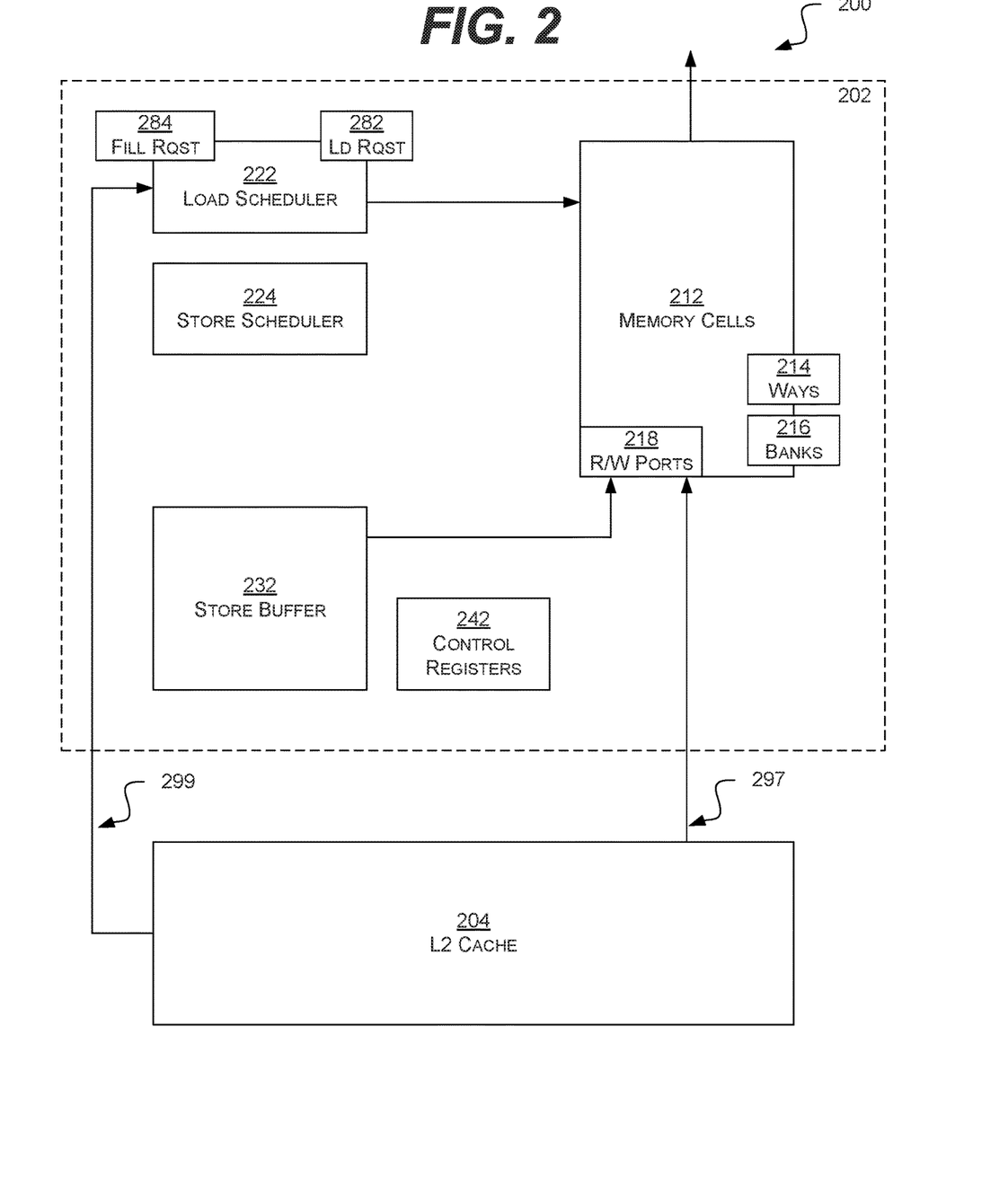
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may be part of a memory hierarchy, as described above.

In the illustrated embodiment, the system 200 may include an L1 cache 202 and an L2 cache 204. The execution unit is not shown.

In the illustrated embodiment, the L1 cache 202 may include a plurality of memory cells 212, arranged in ways 214 and banks 216, and including a fixed number of read and/or write ports 218. As described above, if more read or write requests come into the memory cells 212 than the read/write ports 218 can handle, conflicts occur.

In the illustrated embodiment, the L1 cache 202 may include a load (or read) scheduler or circuit 222, and a store (or write) scheduler or circuit 224. In such an embodiment, the load/store schedulers 222 & 224 may be configured to time the read/write requests from the execution unit such that conflicts do not occur. In various embodiments, the L1 cache 202 may include a store buffer 232 configured to temporarily hold store requests, before they are written into the memory cells 212.

In addition, in one embodiment, the L2 cache 204 may supply fill data (via signal 297) to the memory cells 212. In such an embodiment, the fill data may include a write operation or access to the memory cells 212. In the illustrated embodiment, the L1cache 202 may not include a fill data buffer, and therefore fill requests 284 may have to complete regardless of whether or not a conflict occurs. In such an embodiment, any conflicting load request 282 may have to be delayed or restarted. It is understood that the above is merely one illustrative example to which the disclosed subject matter is not limited.

In the illustrated embodiment, before sending the data 297 to the L1 cache 202, the L2 cache 204 may be configured to alert the L1 cache of an expected fill request 284 completion. In such an embodiment, this may be done via an incoming fill signal 299, or as it is occasionally called a wake-up signal. In such an embodiment, the incoming fill signal 299 may include timing and address information. For example, the fill signal 299 may arrive 6 cycles before the fill data 297 is to be delivered. Therefore, the L1 cache 202 may know that the arrival of the incoming fill signal 299 indicates that fill data 297 will occur in 6 cycles. It is understood that the above is merely one illustrative example to which the disclosed subject matter is not limited. Likewise, the incoming fill signal 299 may include the virtual or physical address associated with the fill data 297.

Traditionally, this incoming fill signal 299 may have just been used to wake-up the L1 cache and allow electrical energy to be applied to the associated banks 216 and ways 214. However, in the illustrated embodiment, the incoming fill signal 299 may also be sent to the load scheduler 222. The load scheduler 222 may then take the fill request 284 (or more accurately the timing and address information associated with the fill request 284) and compare it to the load requests 282 it is already attempting to schedule.

In such an embodiment, the load scheduler 222 may be configured to determine when each load request 282 will be fulfilled (i.e. read from the memory cells 212 to the execution unit). Using the information included in the incoming fill signal 299, the load scheduler 299 may arrange the ordering of the load request 282s such that any conflicting load requests 282s occur before or after the incoming fill request 284.

However, in some embodiments, it may not be possible to avoid a conflict. In such an embodiment, the load scheduler 222 may cause a load request 282 to be denied and restarted, or replayed. However, the occurrence of this remedy may be significantly reduced.

Figure 3:
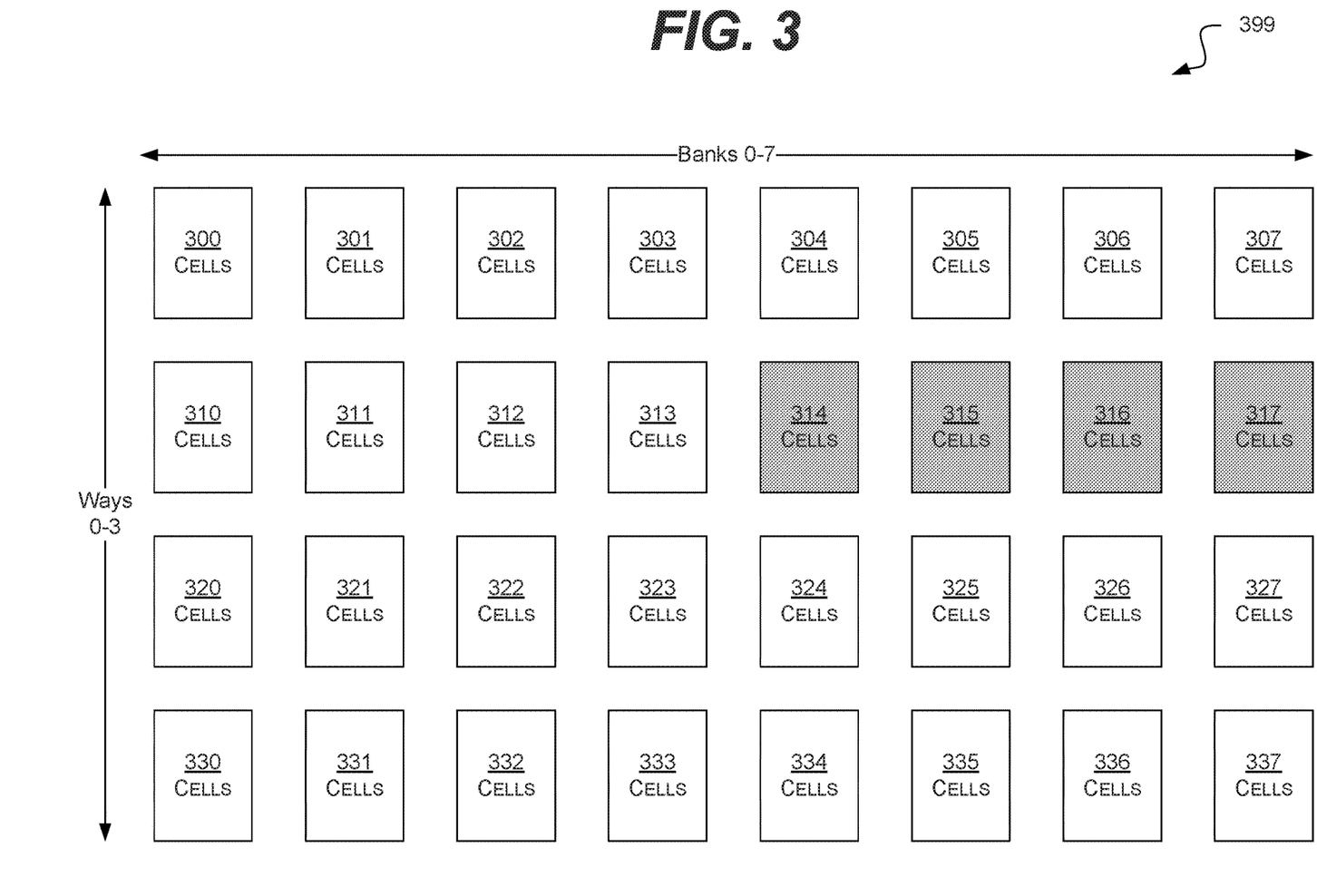
FIG. 3 is a block diagram of an example embodiment of a system in accordance with the disclosed subject matter.

FIG. 3 is a block diagram of an example embodiment of a system 399 in accordance with the disclosed subject matter. In one embodiment, the system 399 may include a plurality of memory cells, arranged in ways and banks.

Specifically, in the illustrated embodiment, the data array or memory cells may be arranged in 4 ways (0-3) and 8 banks (0-7). It is understood that the above is merely one illustrative example to which the disclosed subject matter is not limited. These cells are numbered 300-307, 310-317, 320-327, and 330-337, wherein the second digit is the respective way, and the third digit is the respective bank. In the illustrated embodiment, each way/bank of cells may include a single read/write port, such that only one read or write may occur to the way/bank at a time. Each bank of cells is assumed to be physically tagged, and hence uses a load or store's physical address to check for a cache hit.

In the illustrated embodiment, an incoming fill signal may have indicated that a fill request will be coming in (in X cycles) to an address that corresponds to banks 4-7 of way 1 (cells 314-317). In such an embodiment, if a load request was to attempt to access these same cells 314-317 at the same cycle the single read/write ports would not be able to handle them, and a conflict would occur.

In the illustrated embodiment, the load scheduler may include four pending load requests.

Load-A may be associated with bank 4.
Load-B may be associated with banks 6 & 7.
Load-C may be associated with bank 1.
And, Load-D may not be associated with any bank because its virtual address (VA) may not have been translated to physical address yet.

It is understood that the above are merely a few illustrative examples to which the disclosed subject matter is not limited.

It is noted that in this example embodiment, the load scheduler may know the bank a particular load request is associated with, but may not know the way a particular load request is associated with. As described above, a 4-way set associative may place data from an address into any of the 4 ways. Which way is selected by the L1 cache may not be determined during the scheduling phase. It is understood that the above is merely one illustrative example to which the disclosed subject matter is not limited.

So, due to the incoming fill signal, the load scheduler knows that it should avoid banks 4-7 if it wishes to avoid a conflict. In such an embodiment, the load scheduler may skip over Load-A (bank 4) and Load-B (banks 6 & 7) to select Load-C. In such an embodiment, the load scheduler may pick Load-C to occur the same cycle as the incoming fill request results.

It is noted that without the way information, the conflicting nature of Load-A and Load-B is merely speculative. But, the load scheduler may be configured to act conservatively and attempt to avoid any conflicts, if possible. Further the penalty for delaying Load-A and Load-B by 1 cycle, respectively, is not as great as would occur if a conflict did occur and the load request had to be replayed from scratch.

In various embodiments, the load scheduler may not be able to delay a load request, in which case a load request may be replayed. This replay activity may be partial or entire. Further, the load scheduler may attempt to replay a load request only as a last resort.

Returning to FIG. 2, in another example embodiment, at Cycle 0 the load scheduler 222 receives an incoming fill signal 299. In one embodiment, the receipt of the incoming fill signal 299 indicates that at Cycle 5 the fill data 297 will be received by the L1 cache 202. And at Cycle 7, after the needed preprocessing, the fill data 297 will be written into the memory cells 212. Therefore, the conflict to avoid will (if at all) occur at Cycle 7. Further, the incoming fill signal 299 indicates that the write operation will occur to banks 4-7.

Again, as described above, the load scheduler 222 looks for a load request 282 that will not create conflict. If found, the load scheduler 222 may schedule the non-conflicting load request 282 for Cycle 7. Likewise, any conflicting load requests 282 may be scheduled before or after Cycle 7. For example, a load request 282 associated with banks 4-7 may be scheduled for Cycle 8. Conversely, a load request 282 associated with banks 0-3 may be scheduled for Cycle 7, where it will not conflict with the fill request 284. In various embodiments, this may mean moving load requests forwards or backwards in the queue. In one embodiment, one way to un-schedule or move a load request 282 is by setting or clearing a ready bit associated with respective load request 282.

In various embodiments, the L1 cache 202 may include a set of control registers 242. In one such embodiment, the control registers 242 may indicate the number of cycles between the receipt of the incoming fill signal 299 and the cycle in which a conflict may occur. Although, in another embodiment, as the time between the receipt of the incoming fill signal 299 and the cycle in which a conflict may occur may be deterministic, based upon the embodiment, the load scheduler 222 may treat the value as a constant.

In another embodiment, the control registers 242 may indicate a strategy or level of aggressiveness the load scheduler 222 is to employ when avoiding a conflict. For example, the load scheduler 222 may only be allowed to skip or delay up on a threshold number of pending load requests 282.

As described above, in various embodiments, the timing and address information may only suggest a potential conflict, because, for example, the load and fills might access different ways. If way information is not available at the time the load scheduler 222 must pick a load request 282 to fulfill, the prediction of load-fill conflict based on only bank information may be conservative. In this scenario, the load scheduler 22 may balance or offset this conservativism by allowing the rescheduling of (potentially) conflicting load request 282s only when there is a high possibility that there are other load request 282 ready for pick and that will not conflict.

In such an embodiment, the longer the address of a load request 282 has been known, the higher the probability that there are other load request 282s whose addresses are also known. Therefore, there are more candidate load request 282s which might not conflict. In various embodiments, these additional candidate load requests 282 may be younger then the eldest load request 282.

In one embodiment, the load scheduler 222 may be configured to only reschedule (potentially) conflicting load requests 282 if there are more than a certain number of pending load requests whose address is known (e.g., 3 such pending load request 282s). In another embodiment, the load scheduler 222 may be configured to only reschedule (potentially) conflicting load requests 282 if the eldest load request 282 has had its address known for more than a certain number of cycles (e.g., 2 cycles). In such an embodiment, these threshold values may be dictated by values stored in the control registers 242. It is understood that the above are merely a few illustrative examples to which the disclosed subject matter is not limited.

Figure 4:
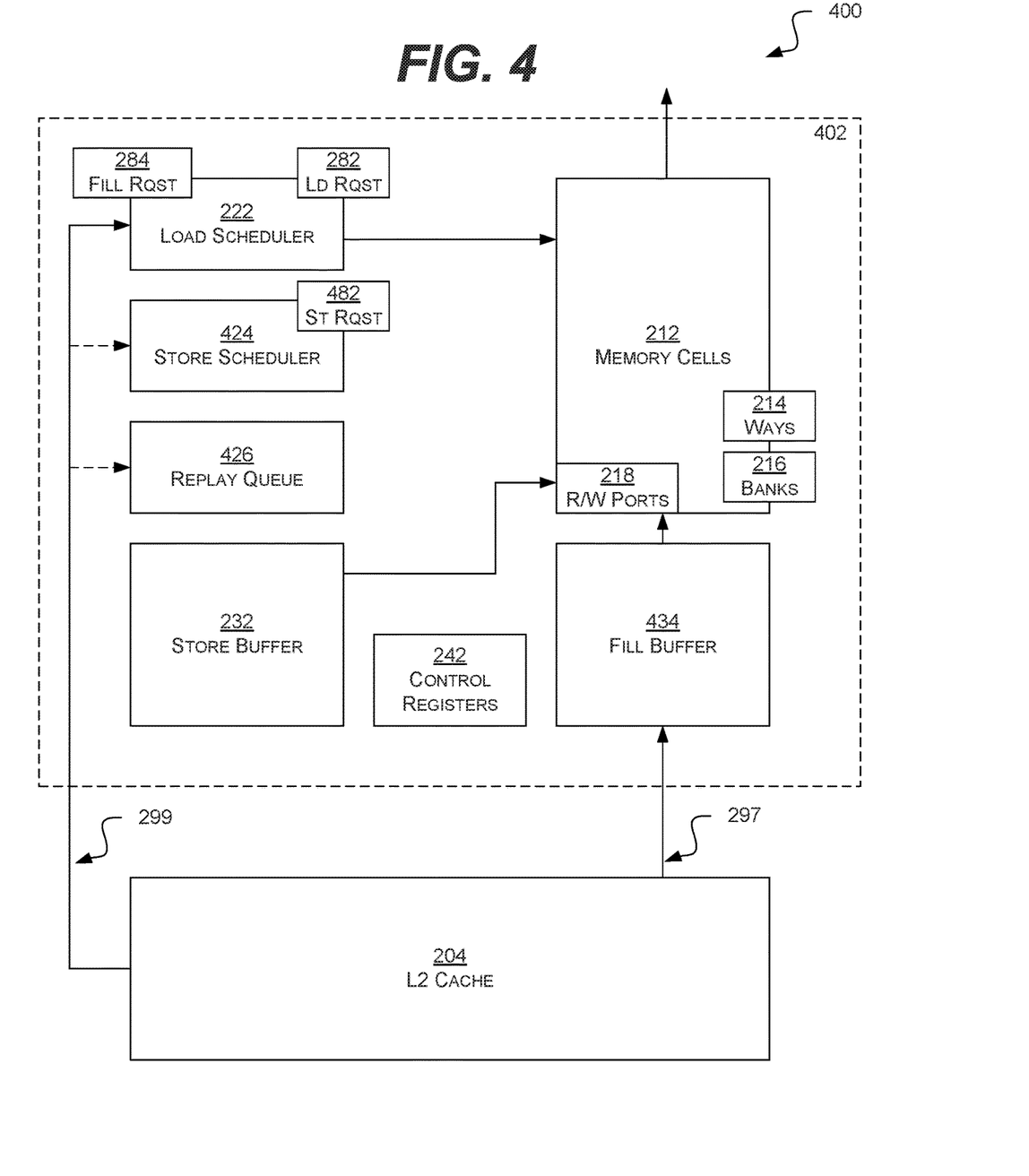
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 400 may be part of a memory hierarchy, as described above.

In the illustrated embodiment, the system 400 may include an L1 cache 402 and an L2 cache 204. The execution unit is not shown.

As described above, in the illustrated embodiment, the L1 cache 402 may include a plurality of memory cells 212, arranged in ways 214 and banks 216, and including a fixed number of read and/or write ports 218. As described above, if more read or write requests come into the memory cells 212 than the read/write ports 218 can handle, conflicts occur. Further, in the illustrated embodiment, the L1 cache 402 may include a load scheduler 222, a store buffer 232, and control registers 242.

In the illustrated embodiment, the L1 cache 402 may include a store scheduler or circuit 424. The store scheduler 424 may be configured to receive the write operations initiated by the execution unit and schedule them accordingly. In various embodiments, the store scheduler 424 may also receive incoming fill signal 299 and use it, at least partially, to schedule store requests 482. In general, this may not be implemented as the read/write ports 218 and store buffer 232 generally relieve any store/fill conflicts.

In the illustrated embodiment, the L1 cache 402 may include a replay queue or circuit 426 configured to replay, at least partially load requests 282 that were not fulfilled (e.g., due to a conflict). In such an embodiment, the replay queue 426 may also receive incoming fill signal 299 and use it, at least partially, to determine which load requests 282 should be replayed, or to delay the replaying of a load request 282 to avoid a future load/fill conflict.

In the illustrated embodiment, the L1 cache 402 may include a fill buffer or circuit 434 configured to store, at least temporarily, the results of a fill request (i.e., fill data 297). In such an embodiment, at least two possibilities occur.

First, the load scheduler 222 may be configured to delay the writing of a fill data 297 as well as delaying or re-scheduling load requests 282. In such an embodiment, the load scheduler 222 may have more options as to how to avoid a conflict.

Secondly, while the system 200 of FIG. 2 included a deterministic value between the time the incoming fill signal 299 arrived and when the fill data 297 would be written into the memory cells 212, the fill buffer 434 makes it possible (in some embodiments) for that delay amount to be non-deterministic. In such an embodiment, the fill buffer 434 may provide the load scheduler 222 with information regarding the time or cycle at which the fill data 297 is expected to be written into the memory cells. In such an embodiment, the load scheduler 222 may then re-schedule based upon this timing data. Also, in such an embodiment, the incoming fill signal 299 may either not include timing information, or merely include timing information that indicates a minimum number of cycles before the fill data 297 may be written, but not the actual, deterministic number of cycles. It is understood that the above are merely a few illustrative examples to which the disclosed subject matter is not limited.

In various embodiments, unlike that described above, the L1 cache 402 may be configured to determine which way a load request 282 will be read from before the load scheduler 222 has to pick or schedule a load request 282. In such an embodiment, the load scheduler 222 may be configured to only reschedule a load request 282 if it conflicts with both the way and bank(s) of the fill request 284. In such an embodiment, the load/fill conflict may be predicted with a much higher rate of accuracy.

Figure 5:
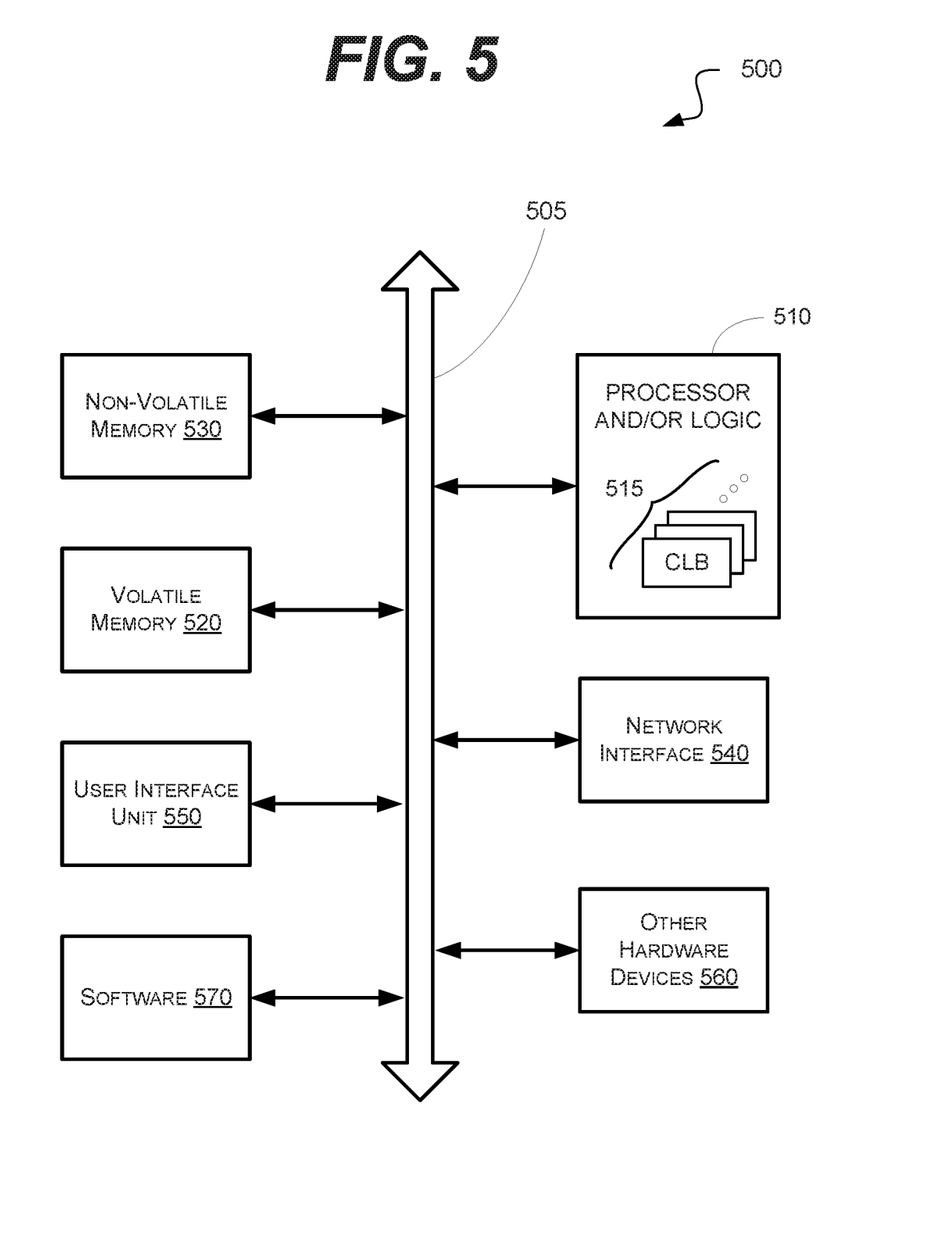
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM)). The information processing system 500 according to the disclosed subject matter may further include a non-volatile memory 530 (e.g., a hard drive, an optical memory, a NAND or Flash memory). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 500 according to the disclosed subject matter may further include a user interface unit 550 (e.g., a display adapter, a haptic interface, a human interface device). In various embodiments, this user interface unit 550 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540) of the information processing system 500. In such an embodiment, the information processing system 500 may include one or more native applications, which may be installed locally (e.g., within the non-volatile memory 530) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
   a first cache configured to store data;
   a second cache configured to, in response to a fill request, supply the first cache with data, and an incoming fill signal; and
   an execution circuit configured to, via a load request, retrieve data from the first cache;
   wherein the first cache is configured to:
      derive, from the incoming fill signal, address and timing information associated with the fill request, and
      based, at least partially, upon the address and timing information, schedule the load request to attempt to avoid a load-fill conflict.

2. The apparatus of claim 1, wherein the first cache comprises a single read-write port for each bank of the first cache.

3. The apparatus of claim 1, wherein the first cache comprises a load scheduler circuit configured to:
   determine when each of a series of load/fill requests will be processed by the first cache,
   at least partially, in response to the address and timing information, predict whether or not a load-fill conflict may occur, and
   if a load-fill conflict may occur, positively schedule load requests that have no load-fill conflicts.

4. The apparatus of claim 1, wherein the first cache comprises a scheduler circuit that can replay ops, configured to:
   at least partially, in response to the address and timing information, predict whether or not a load-fill conflict may occur, and
   if a load-fill conflict may occur, replaying a load request that is associated with the load-fill conflict.

5. The apparatus of claim 1, wherein the first cache includes a plurality of banks and ways; and
   address information indicates which way and bank(s) the fill request will access.

6. The apparatus of claim 5, wherein the load request is associated with a bank; and
   wherein the first cache is configured to select the load request for processing only if the load request is not associated with the same bank as the fill request.

7. The apparatus of claim 6, wherein the load request is associated with a way; and
   wherein the first cache is configured to select the load request for processing only if the load request is not associated with the same bank and the same way as the fill request.

8. The apparatus of claim 1, wherein the first cache is configured to schedule a load request by replaying a conflicting load request.

9. The apparatus of claim 1, wherein the first cache is configured to schedule a load request by:
   selectively rescheduling a conflicting load request based on predetermined requirements such as
   only if the conflicting load request's address is known for more than a certain number of machine cycles, or
   there are more than a certain number of pending load requests, or other requirements.

10. A system comprising:
a processor circuit configured to:
   execute instructions associated with data, and
   retrieve, via a load request, data stored in a first cache; and
a memory system comprising:
   the first cache configured to store data for the processor circuit, and
   a second cache configured to, in response to a fill request, supply the first cache with data, and an incoming fill signal; and
wherein the first cache is configured to:
derive, from the incoming fill signal, address and timing information associated with the fill request, and
based, at least partially, upon the address and timing information, schedule the load request to attempt to avoid a load-fill conflict.

11. The system of claim 10, wherein the first cache comprises a load scheduler circuit configured to:
   determine when each of a series of load/fill requests will be processed by the first cache,
   at least partially, in response to the address and timing information, predict whether or not a load-fill conflict may occur, and
   if a load-fill conflict may occur, positively schedule load requests that have no load-fill conflicts.

12. The system of claim 10, wherein the first cache comprises a scheduler circuit that can replay ops, configured to:
   at least partially, in response to the address and timing information, predict whether or not a load-fill conflict may occur, and
   if a load-fill conflict may occur, replaying a load request that is associated with the load-fill conflict.

13. The system of claim 10, wherein the first cache includes a plurality of banks and ways;
   wherein the address information indicates which way and bank(s) the fill request will access;
   wherein the load request is associated with a bank; and
   wherein the first cache is configured to select the load request for processing only if the load request is not associated with the same bank as the fill request.

14. The system of claim 13, wherein the load request is associated with a way; and
   wherein the first cache is configured to select the load request for processing only if the load request is not associated with the same bank and the same way as the fill request.

15. The system of claim 10, wherein the first cache is configured to schedule a load request by replaying a conflicting load request.

16. The system of claim 10, wherein the first cache is configured to schedule a load request by:
   selectively rescheduling a conflicting load request based on static or dynamic requirements such as
   only if the conflicting load request's address is known for more than a certain number of machine cycles, or
   there are more than a certain number of pending load requests, or other requirements.

17. An apparatus comprising:
   a plurality of memory cells comprising a plurality of banks and ways, and configured to store data; and
   a load scheduler circuit configured to schedule when each of a plurality of load requests will be processed by the apparatus, wherein processing a load request comprises retrieving data from the plurality of memory cells; and
wherein the load scheduler is further configured to:
   derive, from an incoming fill signal, address and timing information associated with a fill request, and
   based, at least partially, upon the address and timing information, schedule the plurality of load requests to attempt to avoid a load-fill conflict.

18. The apparatus of claim 17, wherein the plurality of memory cells comprises a single read-write port for each bank/way combination, such that only one read or write may occur to a bank-way combination at a time.

19. The apparatus of claim 17, wherein the address information indicates which way and bank(s) the fill request will access;
   wherein each load request is associated with a respective bank; and
   wherein the load scheduler circuit is configured to select a load request for processing only if the load request is not associated with the same bank as the fill request, at the same time.

20. The apparatus of claim 17, wherein the load scheduler circuit is configured to schedule a load request by replaying a conflicting load request.

* * * * *